(12) United States Patent
Buls et al.

(10) Patent No.: US 6,905,154 B1
(45) Date of Patent: Jun. 14, 2005

(54) UNIVERSAL ROOM EXTENSION

(75) Inventors: Vincent Buls, Tipton, IA (US); Stacy Hanser, Davenport, IA (US); Paul Edmund Hanser, Tipton, IA (US)

(73) Assignee: HWH Corporation, Moscow, IA (US)

( * ) Notice: Subject to any disclaimer, the term of this patent is extended or adjusted under 35 U.S.C. 154(b) by 32 days.

(21) Appl. No.: 10/709,623

(22) Filed: May 18, 2004

(51) Int. Cl.[7] .................................................. B60P 3/34
(52) U.S. Cl. .................................. 296/26.13; 296/175
(58) Field of Search ................................. 296/165, 170, 296/172, 175, 176, 26.08, 26.09, 26.12, 26.13, 296/171; 52/67, 143

(56) References Cited

U.S. PATENT DOCUMENTS

| | | | |
|---|---|---|---|
| 5,902,001 A | * | 5/1999 | Schneider ................ 296/26.13 |
| 5,908,215 A | * | 6/1999 | Hanser et al. ........... 296/26.12 |
| 5,997,074 A | * | 12/1999 | Alexander .................. 296/172 |
| 6,052,952 A | | 4/2000 | Frerichs et al. |
| 6,067,756 A | | 5/2000 | Frerichs et al. |
| 6,533,338 B1 | | 3/2003 | Frerichs et al. |
| 6,568,734 B2 | | 5/2003 | Buls et al. |
| 6,644,719 B2 | * | 11/2003 | Young, Sr. ............... 296/26.13 |
| 6,658,798 B1 | | 12/2003 | Frerichs et al. |
| 6,679,541 B1 | * | 1/2004 | Hanser et al. .............. 296/172 |
| 6,684,138 B1 | | 1/2004 | Friede et al. |
| 6,729,670 B1 | | 5/2004 | Buls et al. |

* cited by examiner

*Primary Examiner*—Jason Morrow
(74) *Attorney, Agent, or Firm*—James C. Nemmers

(57) ABSTRACT

A push-pull drive chain mechanism and scissors linkage assembly and lifter assembly all powered by hydraulic cylinders to affect the coordinated, linear movement of an expandable room in a recreational vehicle. The drive chain moves generally vertically along a first structural member, such as a vehicle frame member, and then horizontally as the hydraulic cylinders extend or retract to move the expandable room relative to the vehicle frame. The lifter assembly assists in raising and lowering the expandable room so that when the room is extended, the floor of the expandable room will be substantially flush with the floor of the vehicle.

12 Claims, 6 Drawing Sheets

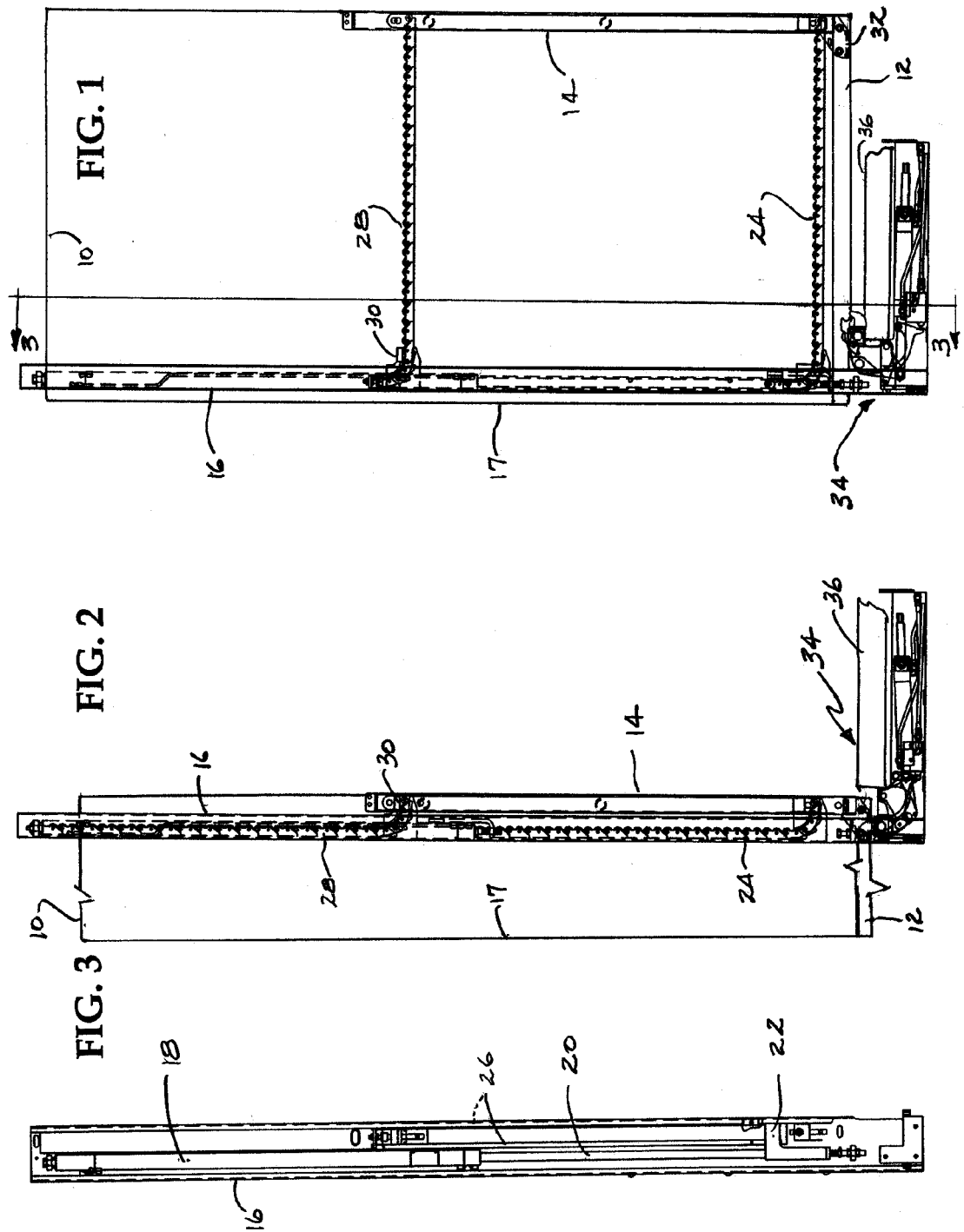

FIG. 8
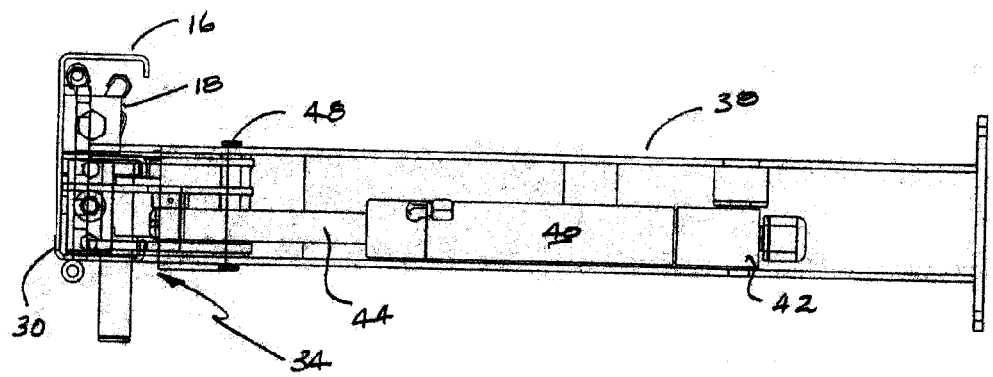
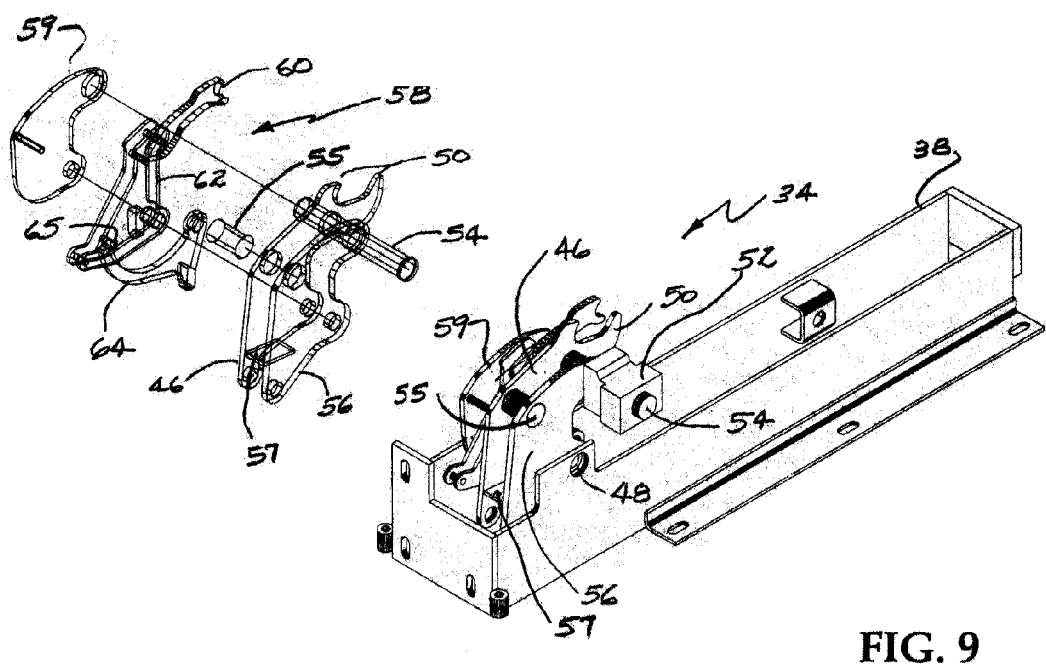
FIG. 9

UNIVERSAL ROOM EXTENSION

BACKGROUND OF INVENTION

The invention relates to a linkage arrangement for moving members together or apart in a substantially horizontal motion without a substantial shift in a direction perpendicular to the desired linear motion while still allowing the members to move a limited distance vertically under controlled conditions. Typical linkages that are commonly used for a variety of purposes involve a pair of parallel members attached pivotally to a pair of parallel linkage members to form a parallelogram. If one of the parallel members is fixed, then motion of the parallelogram linkage results in an angular motion—in or out and up or down rather than simply in or out. Other known arrangements teach a linkage arrangement of the "X" or scissors type for moving members relative to one another in a substantially linear motion. The present invention utilizes a chain driven linkage arrangement for moving the members horizontally relative to each other while allowing for controlled and limited vertical movement.

The invention disclosed herein is particularly useful as a control mechanism for expandable rooms in habitable structures, especially room structures that are telescopically slideable between retracted and extended positions for motorized or towed vehicles. A variety of recreational vehicles are known and used that have a room or a room portion that may be moved from a retracted position while the vehicle is moving over the road to an extended position when the vehicle is stationary in order to provide additional internal space. This type of an arrangement provides adequate space to accommodate users when a recreational vehicle is parked for habitation while still keeping the vehicle within governmental regulations that impose width limitations for vehicles traveling over the road and along highways. When these vehicles are stationary, they are frequently used for habitation for extended periods of time, and when so used, it is highly desirable to be able to maximize the available living space. This is done in a variety of ways in which the user can move a "nested" portion of the expandable room out to its extended or expanded position, typically under hydraulic or electrical power.

These expandable room portions usually comprise a structure that includes a floor, a roof, an external end wall (typically generally parallel to the vehicle side wall), an open (or openable), interior end wall, and one or more side walls (typically generally perpendicular to the vehicle side wall). These components are typically made of frame members and wall panels. In the retracted position, the roof, floor and side walls are typically concealed from exterior view and the room exterior end wall forms a portion of the vehicle side wall. A large factor in the purchase of a vehicle of this type is the amount of useable space that is available inside the vehicle. Thus, it is desirable that the mechanism for extending and retracting the room take up a minimum of space.

The prior art for expanding and retracting expandable rooms generally employs hydraulic arms that are housed inside the vehicle or under the floor of the vehicle. The hydraulic arms contained within the vehicle require a housing unit when they are in their retracted position. This housing unit remains intact when the room is extended taking up space within the vehicle. The hydraulic arms that are housed under the floor are generally complex, relatively expensive, and may be unduly heavy. Further, when the room is in the retracted position, otherwise available storage space under the floor is lost. The additional weight also adversely affects the fuel economy of the vehicle. With the highly competitive market in these recreational vehicles, not only weight and space but also cost and reliability of operation are important factors.

Examples of improved types of linkage utilized in these expandable rooms are disclosed in U.S. Pat. No. 6,568,734 entitled "Straight Motion Parallelogram Linkage", U.S. Pat. No. 6,729,670 entitled "Linkage for Expandable Rooms" and U.S. Pat. No. 6,679,541 entitled "Chain Driven Linkage Assemblies for Room Extensions". It is the object of this invention to provide another type of mechanism for expanding rooms for vehicles which mechanism is reliable in use, lightweight, has fewer components and which will allow for maximum space inside the vehicle. It is a further object to provide a chain-drive assembly that provides for improved motion of structural members together or away from one another in a substantially linear path while allowing limited movement of the members in a direction perpendicular to said path. It is a further object to provide a mechanism for the expansion and retraction of expandable rooms or structures when the rooms or structures are not designed for convenient housing of the mechanism in the floor. It is also an object of the present invention to provide a mechanism wherein a force assist means such as, for example, a hydraulic cylinder, electric drive, or pneumatic control system can be used to drive the movement of a push-pull chain that in turn moves an expandable room, and if needed, such a chain can be provided on both sides of the room and synchronized. Finally, it is an object of the invention to provide a lifting mechanism that allows the expandable room to be flush with the floor of the vehicle when extended and then raised to be positioned on top of the vehicle floor when the expandable room is retracted.

SUMMARY OF INVENTION

The present invention includes a push-pull drive chain mechanism that can be powered by a hydraulic cylinder, electric drive or pneumatic or other similar control system, to affect the coordinated linear movement of an expandable room in a recreational vehicle. A pair of chains are utilized, one on each side of the room. The drive chains move generally vertically along structural members, such as vehicle frame members on each side of the room, and then the chains are redirected for horizontal travel as the hydraulic cylinders are actuated to extend or retract to retract the expandable room. The drive chains are pivotally connected at the proper place on the vehicle structural members, and are constructed and guided to provide the required force for extending and retracting the room.

There preferably are drive chain mechanisms on each side of the expandable room. Use of two chain mechanisms, one on each side of the expandable room, improves the mechanical advantage in moving the expandable room inwardly and outwardly. As the room extends outwardly, a lifting system, comprised of a lifter mechanism on each side of the room, controls vertical movement of the room so that when the room is fully extended, the floors of the vehicle and the expandable room will be substantially flush.

BRIEF DESCRIPTION OF DRAWINGS

FIG. 1 is an interior side elevational view of the chain-linkage assembly and master lifter mechanism for an expandable room and showing the linkage when the room is retracted;

FIG. 2 is an interior side elevational view similar to FIG. 1 but showing the expandable room expanded:

FIG. 3 is a view taken on the line 3—3 of FIG. 1 with some components not shown for purpose of clarity;

FIG. 8 is a top view of the master lifter mechanism;

FIG. 9 is a perspective exploded view of the major components that comprise the master lifter mechanism;

DETAILED DESCRIPTION

Figure 5:
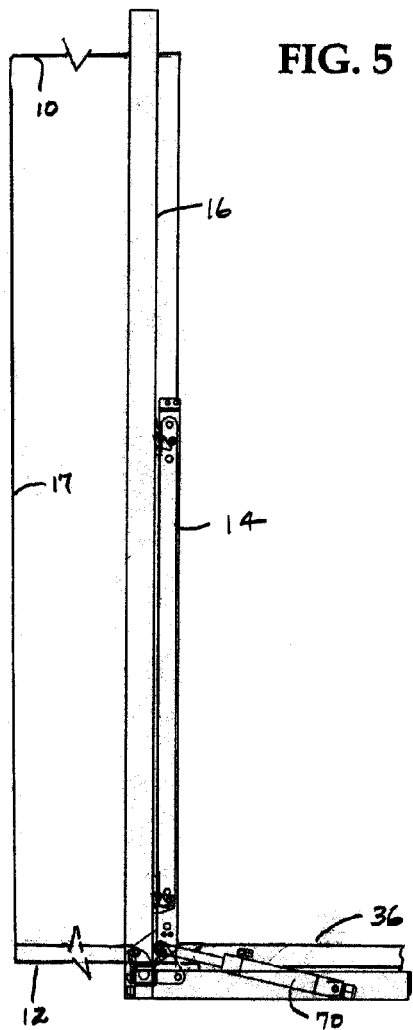
FIG. 5 is an interior side view similar to FIG. 4 but showing the expandable room retracted.

Referring first to FIGS. 1–5, there is illustrated a portion of the framework for an expandable room for a recreational vehicle which, as is well know to those skilled in the art, has an opening formed in its side wall to accommodate an expandable room having an upper horizontal frame member 10 and a lower horizontal frame member 12 that form a part of an interior side wall of an expandable room. The upper surface of the frame members 12 define the floor of the expandable room. Each of the side walls formed by the upper and lower frame members 10 and 12 are connected by a vertical frame member 14 that forms a part of the interior end wall of the expandable room. Similarly, the outer ends of the upper and lower frame members 10 and 12 are connected by vertical frame members (not shown) that form the outer end wall 17 of the expandable room. The side walls shown in FIGS. 1–5 are interconnected by lateral support members (not shown) that form a box-like structure that defines the expandable room. The expandable room nests within the vehicle between vertical supports 16 that form a part of the vehicle side wall structure. An example of an expandable room for a recreational vehicle of the general type to which the invention relates is shown in U.S. Pat. No. 6,067,756. The basic structure of expandable rooms of various sizes are well know to those skilled in the art and therefore all the details of the vehicle and expandable room structures will not be described. FIGS. 2 and 5 show the expandable room structure in its extended position so that there will be additional living or storage space inside the recreational vehicle when the vehicle is stationary, such as at a campsite. As is well known to those skilled in the art, when the vehicle is traveling over the road, the expandable room is retracted (FIGS. 1 and 4) so that the outer end wall of the expandable room is generally flush with the exterior wall of the recreational vehicle that includes vertical support members 16. FIGS. 2 and 5 show the expandable room structure in the extended position with the frame members 14 that form part of the interior end wall of the expandable room positioned adjacent the vehicle support members 16. As is also well known to those skilled in the art, the expandable room typically extends outwardly from a side wall of the recreational vehicle, but the principles of the invention are applicable to the expansion and retraction of a movable structure in other applications as well.

Figure 4:
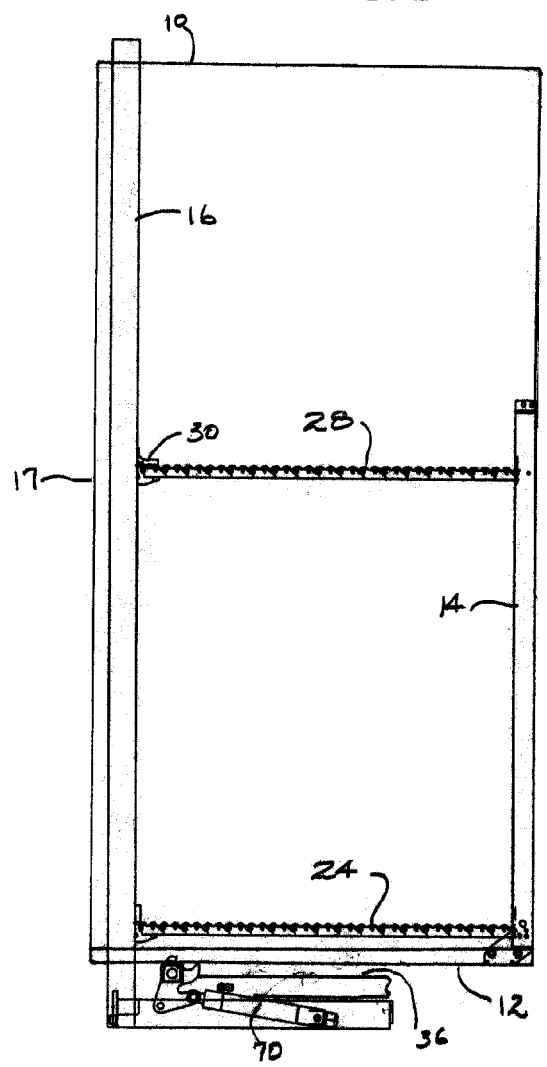
FIG. 4 is an interior side elevational view of the chain-linkage assembly similar to FIG. 1 but showing the slave lifter mechanism for an expandable room and showing the linkage when the room is extended.
Figure 6:
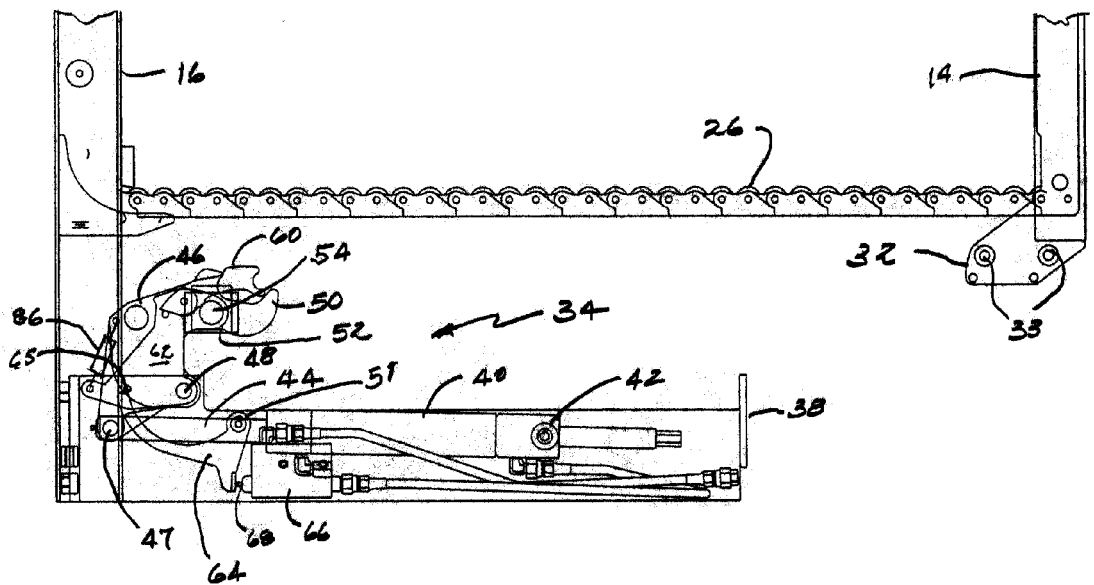
FIG. 6 is an side enlarged elevational view of the master lifter mechanism and the lower portion of the chain-linkage assembly.

FIGS. 1 and 2 are elevational views that illustrate one side of the expandable room which is termed the "master" side, while FIGS. 4 and 5 are similar views that illustrate the "slave" side. Both sets of figures, FIGS. 1–2 and FIGS. 4–5, illustrate the main push-pull chain system that provides for horizontal movement of the room. Since these push-pull chain mechanisms are the same for both the master and slave sides of the expandable room, the components and operation will be described for one side with the identical reference numerals applied to both the master and slave sides of the expandable room.

Mounted in the vehicle vertical support 16 is a hydraulic cylinder 18 having an operating rod 20 to which is connected a bracket 22 that is in turn connected to the end of a lower chain 24. Extending vertically inside the vertical support 16 adjacent the hydraulic cylinder 18 are a pair of parallel rods 26 which are secured to the bracket 22 so as to connect the end of the lower chain 24 with the end of the upper chain 28. This provides for simultaneous movement of both chains 24 and 28 when the operating rod 20 moves to either push or pull the chains 24 and 28. The chains 24 and 28 are guided for limited vertical movement between the rods 26, and the chains 24 and 28 exit the vertical support 16 through a guide member 30 that turns the chains 24 and 28 from vertical to horizontal where the other ends of the chains are connected to the vertical frame members 14 that form a part of the interior end wall of the expandable room. Each of the drive chains 24 and 28 are comprised of consecutive links pivotally connected to each other and are of a type that allow the drive chains 24 and 28 to flex in one direction only thereby allowing the chain to be pushed from one end link to the other end link as well as being pulled. A chain of this type is well known to those skilled in the art and is more specifically described in U.S. Pat. No. 6,679,541. Thus, as the operating rod 20 of hydraulic cylinder 18 travels vertically, chains 24 and 28 are pushed or pulled to move the expandable room horizontally between a retracted position or an extended position.

Secured to the bottom of the vertical frame member 14 of the expandable room is a bracket 32 having actuating pins 33 which interface with a toggle in the lifting mechanism, indicated generally by the reference numeral 34, and which will now be described in detail.

Referring now to FIGS. 1, 2, 6, 9 and 10, it will be seen that the lifting mechanism 34 is mounted beneath the level of the vehicle floor 36 on a support member 38 that is secured to the vehicle frame and to the vehicle vertical support 16. FIGS. 1, 2, 6 and 9 show the master side of the room in which a hydraulic lifter cylinder 40 is pivotally mounted at its cap end 42 to the support member 38. The operating rod 44 of cylinder 40 is pivotally connected to a toggle 46 by pin 47, the toggle 46 being turnable about pin 48 secured to the support member 38. The toggle 46 has generally upwardly extending fingers 50. The toggle 46 is connected by spacer pin 55 and stiffener 57 to a secondary toggle bracket 56 that supports a slide block 52 turnable about pin 54. Pin 54 extends through toggle 46, the secondary toggle bracket 56 and bracket 59. The slide block 52 serves as one of the supports for the expandable room by being engageable with the horizontal frame member 14.

Figure 7:
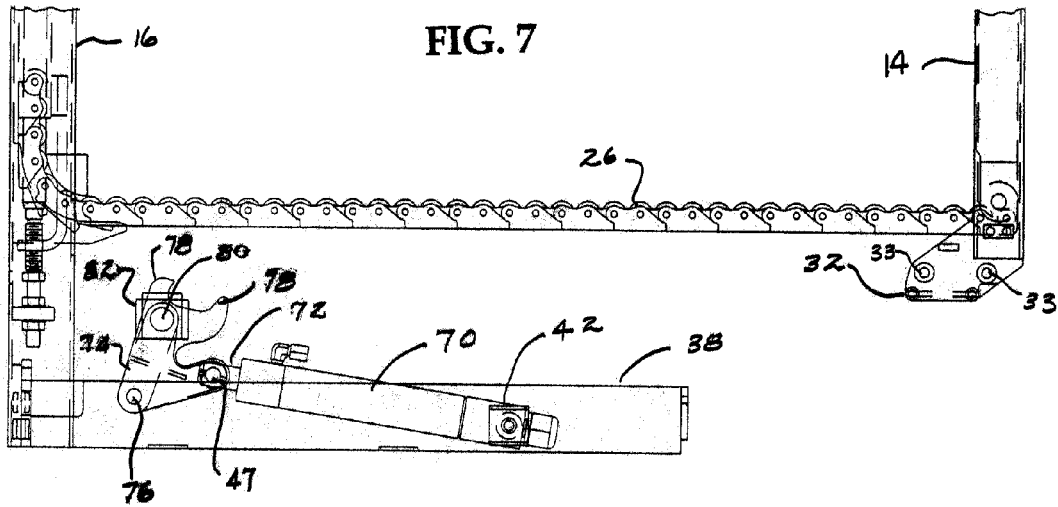
FIG. 7 is an enlarged side elevational view of the slave lifter mechanism and the lower portion of the chain-linkage assembly.

FIGS. 4, 5 and 7 show the slave side of the expandable room. As shown in these figures, support member 38 contains a slave hydraulic lifter cylinder 70 with an operating rod 72 that is pivotally connected to a toggle 74 substantially identical to the toggle 46 on the master side of the expandable room. Toggle 74 is pivotally mounted about pin 76 on the support member 38 and has upwardly extending fingers 78. Pivoted to the toggle by pin 80 is a slide block 82 which is another support for the expandable room, being engageable with the horizontal frame member 12.

The lifter mechanism 34 also includes a switch mechanism indicated generally by the reference numeral 58. Switch mechanism 58 includes a switch arm 60 pivotally attached to a main switch member 62 that is turnable about pin 48. Switch mechanism 58 also includes an actuating arm 64 turnable about pin 51. Bracket 59 holds the switch mechanism 58 inside the lifting mechanism 34. With the toggle 46 in the raised position, the switch arm 60 is located between the fingers 50 of the toggle 46 and therefore can be engaged by the leading roller pin 33 on bracket 32 as the room moves from a retracted to an extended position. Since the main switch arm 62 is pivoted about the same pivot pin 48 about which the toggle 46 rotates, this allows the switch mechanism 58 to operate independently of the toggle 46. Main switch member 62 carries a pin 65 (FIG. 6) that engages the curved inner surface of the actuating arm 64 of switch mechanism 58 and thus holds the arm 64 in the same position as the pin 65 travels along the curved surface. The lifter support member 38 supports a valve block 66 containing an unlock switch 68 that is engageable by the actuating arm 64 as the arm rotates (See FIG. 6). As will be more fully described hereinafter, the switch mechanism 58 provides a safety feature that assures that the expandable room will not drop suddenly as it is extended, which drop could cause damage to the room or the vehicle floor.

Figure 10:
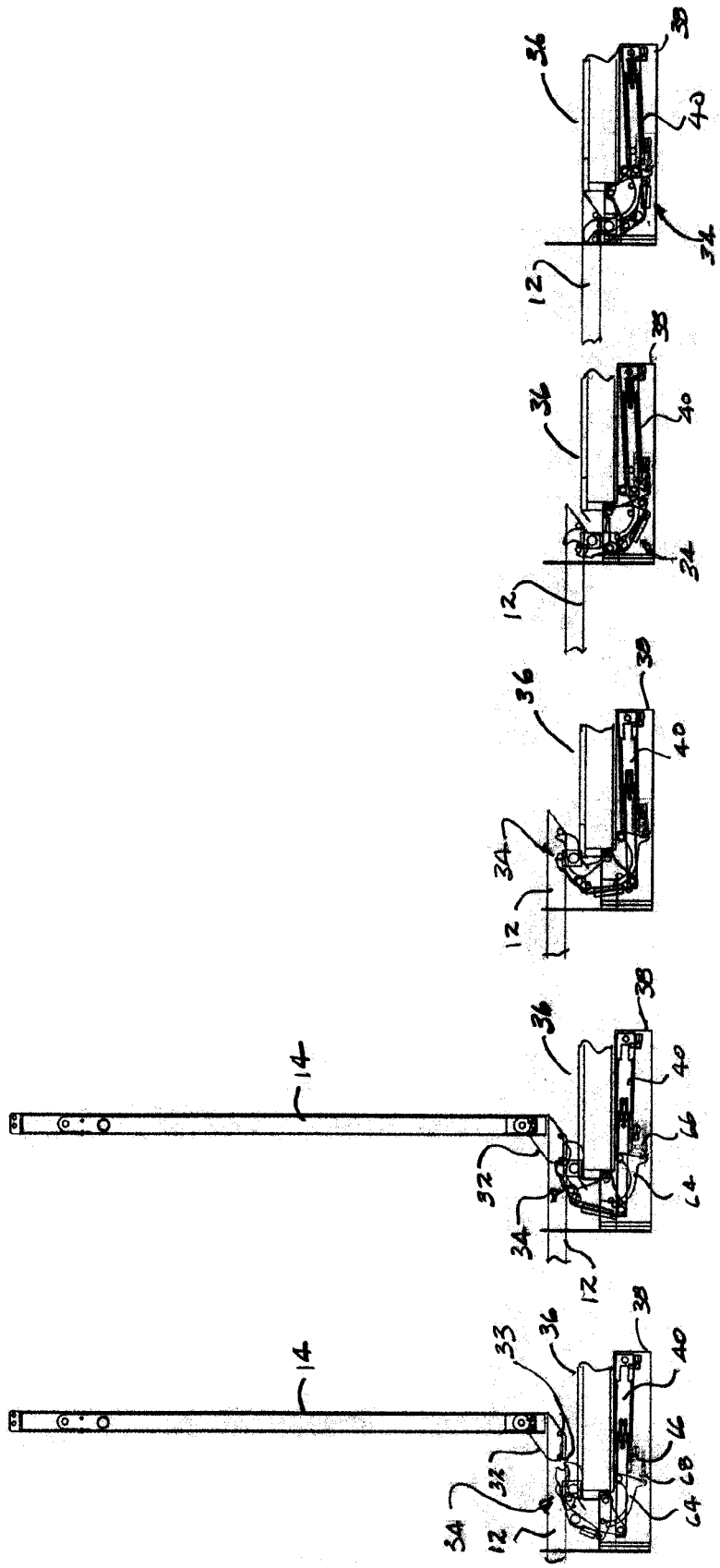
FIGS. 10a through 10e are a series of side elevational views of portions of the structure that illustrate the movement of the lifter mechanism while the expandable room moves from a retracted to an extended position in which the floor of the expandable room lowers to the level of the vehicle floor.
Figure 11:
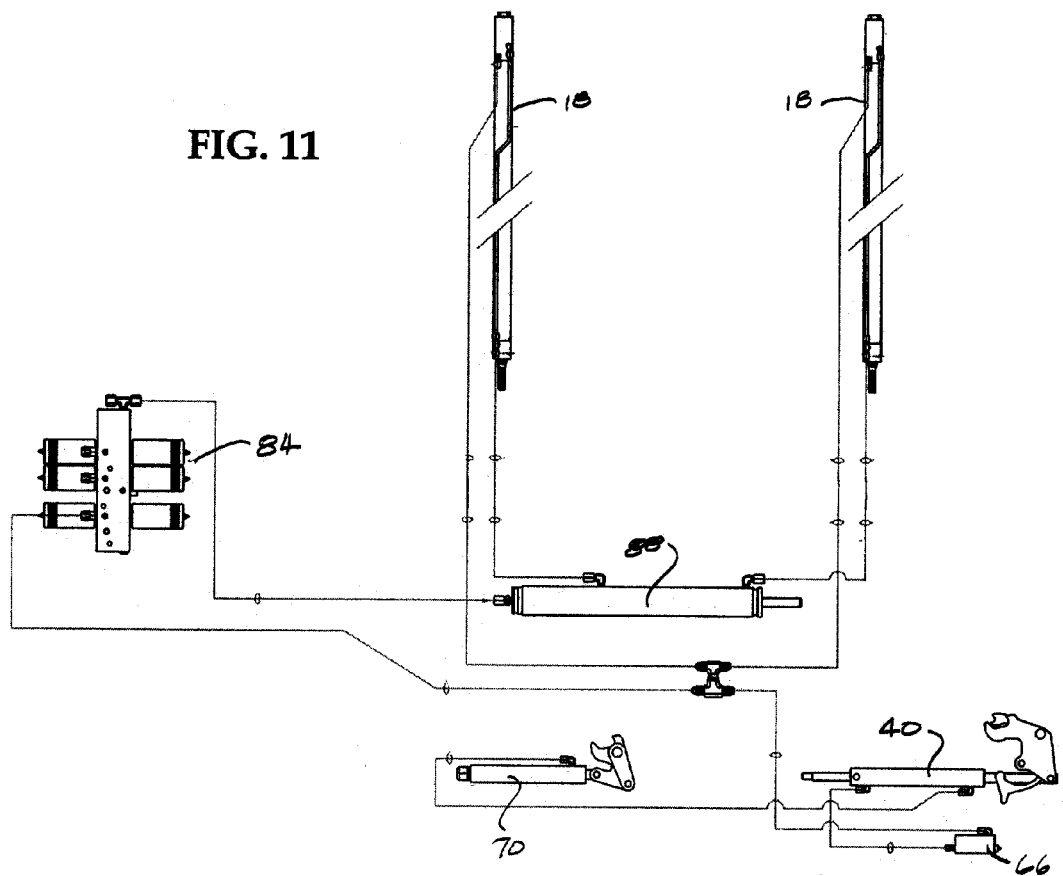
FIG. 11 is a schematic diagram of the hydraulic system that controls the drive chain-linkage assembly and lifter mechanisms.

FIGS. 10a 10e illustrate the action of the lifter mechanism 34 as the expandable room moves from a retracted to an extended position, while FIG. 11 is a schematic diagram of the hydraulic system of the preferred embodiment of the invention. When the expandable room is fully retracted, the main cylinders 18 as well as the lifter cylinders 40 and 70 are all extended. FIG. 10a shows the expandable room retracted but starting to move to an extended position from right to left of FIG. 10. In this position, the expandable room is supported above the coach vehicle floor 36, and as the expandable room is extended, the slide blocks 52 and 82 engaged by the horizontal frame members 12 support the room as it moves. As previously described, the bracket 32 that is secured at the lower end of the interior end wall vertical frame member 14 contains actuating roller pins 33. As the expandable room continues to move to an extended position, the first or leading pin 33 on the bracket 32 makes contact with the switch arm 60 to depress it and cause rotation of the main switch member 62 which in turn pivots the actuating arm 64 that engages and depresses unlock switch 68 on the valve block 66. Once switch 68 is thus unlocked, hydraulic fluid is allowed to flow back to pump-manifold 84. At this time, and as long as switch 68 remains unlocked, only residual fluid pressure exists in the lifter cylinders 40 and 70. As the main drive chain mechanism through the action of cylinders 18 continues to extend the expandable room, the pins 33 on the brackets 32 engage the toggle fingers 50 and 78 of their respective lifter mechanisms 34. As the room continues to move to an extended position, the toggles 46 and 74 will be rotated about their respective pivot pins 48 and 76 carrying with them the slide blocks 52 and 82 which are supporting the lower horizontal frames 12 of the expandable room. When the slide blocks 52 and 82 are moved to a position substantially vertical over the toggle pivot pins 48 and 76 (see FIG. 10c), further outward movement of the expandable room will rotate the toggles 46 and 74 over center and then downwardly as the weight of the expandable room pulls the room downwardly. The drive chains 24 and 28 resist the free fall of the room and control the speed of descent. The toggles 46 and 74 control the downward path of the room as it is lowered in an arcing motion, and the main drive chain mechanism through cylinders 18 controls the speed at which the expandable room descends. FIG. 10d shows the toggles 46 and 74 over center while FIG. 10e shows the room fully descended so that the floor of the expandable room is level with the vehicle floor 36.

As previously described, during extension of the expandable room, the lifter cylinders 40 and 70 will contain only residual pressure after the unlock switch 68 actuates the valve block 66 to allow the hydraulic fluid in the cylinders to flow back to the pump-manifold 84. The lifting mechanism 34 will function without the switch mechanism 58, but for the safety reason mentioned, we prefer that the switch mechanism 58 be included in the system. Before the room is later retracted and raised by the main drive chain mechanism and the lifter mechanism 34, the components of the switch mechanism 58 are returned to their original position by action of a spring 86 (see FIG. 6).

When it is desired to retract the room, the main chain drive mechanism and lifter mechanisms 34 work in reverse to that just described for extending the expandable room, with the lifter mechanisms 34 lifting the expandable room upward while the main drive chain mechanism controls the speed of movement of the expandable room. The lifter cylinders 40 and 70 are connected in series and share only a single common connection to the hydraulic system on the cap side of the pump (see FIG. 11). Because the lifter cylinders 40 and 70 share connection with the cap side of the main cylinders 18, cylinders 40 and 70 are pressurized and the toggles 46 and 74 begin to rotate (counter clockwise in the drawings) as the main cylinders 18 are pressurized to extend and therefore retract the room by extending the chains 24 and 28. Because the pins 33 on the room brackets 32 are interfaced with the toggles 46 and 74, the room will start moving upwardly and inwardly. The room will remain substantially horizontal as it pivots independently of the toggles 46 and 74 about the pivot pins 54 and 80 that support the slide blocks 52 and 82. Once the toggles 46 and 74 are in the fully raised position, the interface with the pins 33 of the room brackets 32 disengages and the room continues to travel horizontally under power of the main chain drive mechanism.

FIG. 11 is a schematic diagram of the hydraulic system of the invention. As shown in FIG. 11, the main hydraulic cylinders 18 on both the master and slave sides are connected to a synchronizing cylinder 88 that assures movement of both sides of the room simultaneously to prevent any lateral movement which would bind the room as it is extended and retracted. The master hydraulic cylinder 40 is connected in series to the slave hydraulic cylinder 70 and the cylinders are synchronized in any suitable manner, such as a poppit (not shown) that maintains the volume of hydraulic fluid between the cylinders constant. This assures that the two cylinders 40 and 70 will move at the same rate. In the alternative, the lifter cylinders may be connected in parallel and synchronized by a synchronizing cylinder similar to cylinder 88. As previously described, when the operating rods 20 of the main cylinders 18 are extended, this causes the drive chains 24 and 28 to extend and move the room to a retracted position. Because the master lift cylinder 40 and the slave lift cylinder 70 share a common connection through pump-manifold assembly 84, they are all under the same pressure. During room retraction, when the master lifter cylinder 40 and slave lifter cylinder 70 are actuated, the toggles 46 and 74 are thus rotated simultaneously. As previously described, the interface between the toggles 46 and 74 and the pins 33 on the brackets 32 controls the curved path of the room upward and downward during both extension and retraction of the room.

Although the preferred embodiments describe the use of master and slave lifter mechanisms on opposite sides of the room, it should be understood that the system of the invention will function if either the "slave mechanism" or "master mechanism" is used on both sides of the room. Having thus described the invention in connection with the preferred embodiments thereof, it will be evident to those skilled in the art that various revisions can be made to the preferred embodiments described herein without departing from the spirit and scope of the invention. It is our intention, however, that all such revisions and modifications that are evident to those skilled in the art will be included within the scope of the following claims.

What is claimed is:

1. A system for horizontally moving an expandable room structure between a retracted position within a vehicle and an extended position protruding outwardly from a wall of the vehicle while providing for limited controlled vertical movement of the room relative to the vehicle, the system comprising:
   a vehicle wall including vertically extending structural members that define an opening in the vehicle wall;
   an expandable room structure including top, bottom and side structural members which define an interior end wall and an exterior end wall disposed generally parallel to the vehicle wall and which further define side walls extending generally perpendicular to the interior end wall and exterior end wall, the expandable room being positioned for movement through the opening in the vehicle wall from a retracted position to an extended position;
   a power device mounted in one of the vertically extending structural members of the vehicle wall adjacent the opening in the wall;
   a drive chain combined with the said one of the vertical structural members of the vehicle wall and having a plurality of pivotally connected links extending between end links, the links being capable of pivoting in one direction only thereby providing for the chain to be pulled by tensile forces applied to the chain or pushed by compressive forces applied to the chain;
   one of the end links of the drive chain being operatively connected to the power device and the other end link being operatively connected to the interior end wall of the expandable room with the chain extending mostly vertically when the expandable room is in the extended position and mostly horizontally when the expandable room is in the retracted position; and
   a guide member combined with the vertically extending structural member containing the power device to guide the drive chain between vertical and horizontal positions, whereby actuation of the power device causes the chain to move the expandable room between retracted and extended positions.

2. The system for horizontally moving an expandable room structure of claim 1 in which the power device is a hydraulic cylinder vertically mounted in the vertically extending structural member of the vehicle wall.

3. The system for horizontally moving an expandable room structure of claim 2 in which there is a second hydraulic cylinder in a second vertically extending structural member adjacent the opening in the vehicle wall, and a second drive chain is combined with the second vertically extending structural member of the vehicle wall, the second drive chain being operatively connected to the second hydraulic cylinder and to the interior end wall of the expandable room.

4. The system for horizontally moving an expandable room structure of claim 3 in which the hydraulic cylinders are combined with a synchronizing cylinder that synchronizes the operation of the hydraulic cylinders so that movement of the drive chains will be at the same rate.

5. A system for horizontally moving an expandable room structure between a retracted position within a vehicle and an extended position protruding outwardly from a wall of the vehicle while providing for limited controlled vertical movement of the room relative to the vehicle, the system comprising:
   a vehicle wall and floor including vertically extending structural members that define an opening in the vehicle wall;
   an expandable room structure including top, bottom and side structural members which define an interior end wall and an exterior end wall disposed generally parallel to the vehicle wall and which further define side walls and a floor extending generally perpendicular to the interior end wall and exterior end wall, the expandable room being positioned for movement through the opening in the vehicle wall from the retracted position to the extended position;
   a power device combined with the vehicle wall structure and operatively connected to the expandable room to move the expandable room between its retracted position in which the floor is above the vehicle floor and its extended position in which the expandable room floor is substantially level with the vehicle floor;
   a lifting mechanism for controlling the path of the expandable room when moved from its extended position to its retracted position, the lifting mechanism comprising:
   a power lift cylinder combined with the vehicle floor beneath the floor;
   a toggle assembly operatively connected to the power lift cylinder and pivotally moveable from a raised position to a lowered position;
   a slide block pivotally connected to the toggle assembly and positioned to be engageable with a structural member of the floor of the expandable room to guide and partially support the room as it moves between retracted and extended positions; and
   a room mount bracket attached to the expandable room beneath the floor of the room and aligned to engage the toggle assembly as the expandable room moves between the retracted position and the extended position and thereby control the path of the room as it moves between a position above the vehicle floor to a position substantially level with the vehicle floor.

6. The system for horizontally moving an expandable room structure of claim 5 in which there is a lifting mechanism beneath each side of the expandable room.

7. The system for horizontally moving an expandable room structure of claim 6 in which the lifting mechanism beneath one side of the expandable room is the master mechanism and the lifting mechanism on the other side of the expandable room is the slave mechanism.

8. The system for horizontally moving an expandable room structure of claim 7 in which the master lifting mechanism also includes a safety switch mechanism that is engageable by the room mount bracket when the toggle assembly is in the raised position, the switch mechanism interacting with the power lift cylinders to prevent premature dropping of the expandable room as it moves to a fully extended position.

9. A system for horizontally moving an expandable room structure between a retracted position within a vehicle and an extended position protruding outwardly from a wall of the vehicle while providing for limited controlled vertical movement of the room relative to the vehicle, the system comprising:
- a vehicle wall and floor including vertically extending structural members that define an opening in the vehicle wall;
- an expandable room structure including top, bottom and side structural members which define an interior end wall and an exterior end wall disposed generally parallel to the vehicle wall and which further define side walls and a floor extending generally perpendicular to the interior end wall and exterior end wall, the expandable room being positioned for movement through the opening in the vehicle wall from a retracted position to an extended position;
- a power device mounted in one of the vertically extending structural members of the vehicle wall adjacent the opening in the wall;
- a drive chain combined with the said one of the vertical structural members of the vehicle wall and having a plurality of pivotally connected links extending between end links, the links being capable of pivoting in one direction only thereby providing for the chain to be pulled by tensile forces applied to the chain or pushed by compressive forces applied to the chain;
- one of the end links of the drive chain being operatively connected to the power device and the other end link being operatively connected to the interior end wall of the expandable room with the chain extending mostly vertically when the expandable room is in the extended position and mostly horizontally when the expandable room is in the retracted position;
- a guide member combined with the vertically extending structural member containing the power device to guide the drive chain between vertical and horizontal positions, whereby actuation of the power device causes the chain to move the expandable room between its retracted position in which the floor of the expandable room is above the vehicle floor and its extended position in which the expandable room floor is substantially level with the vehicle floor; and
- a lifting mechanism for controlling the path of the expandable room when moved from its extended position to its retracted position, the lifting mechanism comprising:
- a power lift cylinder combined with the vehicle floor beneath the floor;
- a toggle assembly operatively connected to the power lift cylinder and pivotally moveable from a raised position to a lowered position;
- a slide block pivotally connected to the toggle assembly and positioned to be engageable with a structural member of the floor of the expandable room to guide and partially support the room as it moves between retracted and extended positions; and
- a room mount bracket attached to the expandable room beneath the floor of the room and aligned to engage the toggle assembly as the expandable room moves between the retracted position and the extended position and thereby control the path of the room as it moves between a position above the vehicle floor to a position substantially level with the vehicle floor.

10. The system for horizontally moving an expandable room structure of claim 9 in which the power device is a hydraulic cylinder vertically mounted in the vertically extending structural member of the vehicle wall.

11. The system for horizontally moving an expandable room structure of claim 10 in which there is a second hydraulic cylinder in a second vertically extending structural member adjacent the opening in the vehicle wall, and a second drive chain is combined with the second vertically extending structural member of the vehicle wall, the second drive chain being operatively connected to the second hydraulic cylinder and to the interior end wall of the expandable room.

12. The system for horizontally moving an expandable room structure of claim 11 in which the hydraulic cylinders are combined with a synchronizing cylinder that synchronizes the operation of the hydraulic cylinders so that movement of the drive chains will be at the same rate.

* * * * *